United States Patent
Patton, III (10) Patent No.: US 6,826,007 B1
(45) Date of Patent: Nov. 30, 2004

(54) DISK DRIVE USING DUAL SLOPE INTEGRATOR TO EXTRACT VELOCITY OF AN ACTUATOR ARM FROM A BACK EMF VOLTAGE

(75) Inventor: Charles R. Patton, III, Murrieta, CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 267 days.

(21) Appl. No.: 10/232,916

(22) Filed: Aug. 30, 2002

(51) Int. Cl.[7] .............................................. G11B 5/591
(52) U.S. Cl. ...................................... 360/78.06; 360/75
(58) Field of Search .............................. 360/75, 78.06, 360/78.04, 78.09; 318/373, 811, 103, 696, 280, 615, 459; 323/282; 324/177

(56) References Cited

U.S. PATENT DOCUMENTS

| | | | |
|---|---|---|---|
| 5,654,840 A | | 8/1997 | Patton et al. |
| 5,963,393 A | * | 10/1999 | Rowan et al. ............ 360/78.06 |
| 5,982,130 A | * | 11/1999 | Male ........................... 318/615 |
| 6,081,112 A | | 6/2000 | Carobolante et al. |
| 6,097,564 A | | 8/2000 | Hunter |
| 6,479,954 B1 | * | 11/2002 | Peritore et al. ............. 318/254 |

* cited by examiner

Primary Examiner—Sinh Tran
Assistant Examiner—K. Wong
(74) Attorney, Agent, or Firm—Milad G. Shara, Esq.; Howard H. Sheerin, Esq.

(57) ABSTRACT

A disk drive is disclosed comprising a velocity extraction circuit for extracting a velocity of an actuator arm from a back EMF voltage across a voice coil of a voice coil motor when embedded servo information is unavailable. The velocity extraction circuit comprises a dual slope integrator for integrating a voltage representing a current flowing through the voice coil and the voltage across the voice coil. The sum of the integrations cancels the resistance of the voice coil from the back EMF measurement. In one embodiment, the dual slop integrator also integrates the reverse polarity of the voltage representing the current flowing through the voice coil and the reverse polarity of the voltage across the voice coil in order to cancel the inductance (L·di/dt) of the voice coil from the back EMF measurement.

19 Claims, 11 Drawing Sheets

DISK DRIVE USING DUAL SLOPE INTEGRATOR TO EXTRACT VELOCITY OF AN ACTUATOR ARM FROM A BACK EMF VOLTAGE

BACKGROUND OF THE INVENTION

1. Field of the Invention

The present invention relates to disk drives for computer systems. More particularly, the present invention relates to a disk drive using a dual slope integrator to extract a velocity of an actuator arm from a back EMF voltage.

2. Description of the Prior Art

Disk drives employ embedded servo sectors to derive the velocity of an actuator arm during normal seeking and tracking operations in order to control the speed of a voice coil motor (VCM). However, there are times when the embedded servo information is unavailable, such as ramp loading/unloading, when it is still desirable to derive the velocity of the actuator arm in order to control its speed in a closed loop servo system. The prior art has suggested to derive the velocity of the actuator arm by processing the back EMF voltage present across the voice coil of the VCM. The VCM is essentially an RLC circuit where R is resistance, L inductance, and C the inertia of the motor and load. The voltage contribution of C to the measured back EMF is proportional to the velocity of the actuator arm. By canceling the contribution of R as well as L·di/dt, the remaining back EMF voltage represents the velocity of the actuator arm.

Accurately canceling the contribution of R from the back EMF voltage requires compensating for the fluctuations in R, for example, fluctuations due to changes in the ambient temperature as well as self-heating. Accurately canceling the contribution of L·di/dt requires an accurate estimate of the VCM's transient response. The prior art techniques for calibrating the VCM's resistance R typically include a calibration procedure executed periodically, such as pressing the actuator arm against a fixed object to measure the back EMF voltage contribution of R. However, the accuracy of the estimated R depends on the frequency of the calibration procedure which can degrade the performance of the disk drive. U.S. Pat. No. 6,097,564 discloses a method for estimating the VCM's transient response using a sophisticated "model simulator" in order to cancel the contribution of L·di/dt from the back EMF voltage. However, this solution is complex, expensive, and error prone since the model simulator only approximates the VCM/servo-driver transient response.

There is, therefore, a need to accurately and cost effectively cancel the voltage contribution of the VCM's resistance R and the contribution of L·di/dt from the back EMF voltage to derive an accurate velocity estimate for the actuator arm when embedded servo information is unavailable.

SUMMARY OF THE INVENTION

The present invention may be regarded as a disk drive comprising a disk having a plurality of tracks, an actuator arm, a head connected to a distal end of the actuator arm, a voice coil motor comprising a voice coil, the voice coil motor for rotating the actuator arm about a pivot to actuate the head radially over the disk, and a velocity extraction circuit for extracting a velocity of the actuator arm from a back EMF voltage across the voice coil. The velocity extraction circuit comprises an integrator. During a first time interval the integrator integrates a first voltage representing a current flowing through the voice coil to generate a first integration, and during a second time interval integrating a second voltage across the voice coil to generate a second integration. A polarity of the first voltage is opposite a polarity of the second voltage, and the velocity of the actuator arm is computed by summing the first and second integrations.

In one embodiment, the voltage extraction circuit comprises a sense resistor connected in series with the voice coil for detecting the current flowing through the voice coil, wherein the first voltage is measured across the sense resistor.

In one embodiment during a calibration mode when the velocity of the actuator arm is substantially zero at least one of the first and second time intervals is adjusted until the sum of the first and second integrations substantially equals a predetermined value. In another embodiment, the integrator comprises an amplifier and a variable resistor for setting the gain of the amplifier. During the calibration mode when the velocity of the actuator arm is substantially zero, the variable resistor is adjusted until the sum of the first and second integrations substantially equals a predetermined value.

In one embodiment during the calibration mode the actuator arm is pressed against a fixed object. In another embodiment, during the calibration mode the head is maintained over a centerline of a target track during a tracking operation so that the velocity of the actuator arm is substantially zero on average.

In one embodiment, the integrator comprises an amplifier and a capacitor.

In yet another embodiment, the velocity extraction circuit waits a third time interval following the first and second time intervals. During a fourth time interval, the integrator integrates a third voltage across the sense resistor to generate a third integration, and during a fifth time interval the integrator integrates a fourth voltage across the voice coil to generate a fourth integration. A polarity of the third voltage is opposite a polarity of the first voltage, and a polarity of the fourth voltage is opposite a polarity of the second voltage. The velocity of the actuator arm is derived relative to the sum of the first, second, third and fourth integrations. In one embodiment, the fourth time interval is greater than the first time interval and the fifth time interval is greater than the second time interval. In another embodiment, during a calibration mode when the velocity of the actuator arm is substantially zero the third time interval is adjusted until the sum of the first, second, third and fourth integrations substantially equals a predetermined value.

The present invention may also be regarded as a method of extracting a velocity of an actuator arm in a disk drive from a back EMF voltage across a voice coil of a voice coil motor. A first voltage across a sense resistor in series with the voice is integrated during a first time interval to generate a first integration. A second voltage across the voice coil is integrated during a second time interval to generate a second integration. A polarity of the first voltage is opposite a polarity of the second voltage, and the velocity of the actuator arm is derived relative to the sum of the first and second integrations.

DESCRIPTION OF THE PREFERRED EMBODIMENTS

Figure 1:
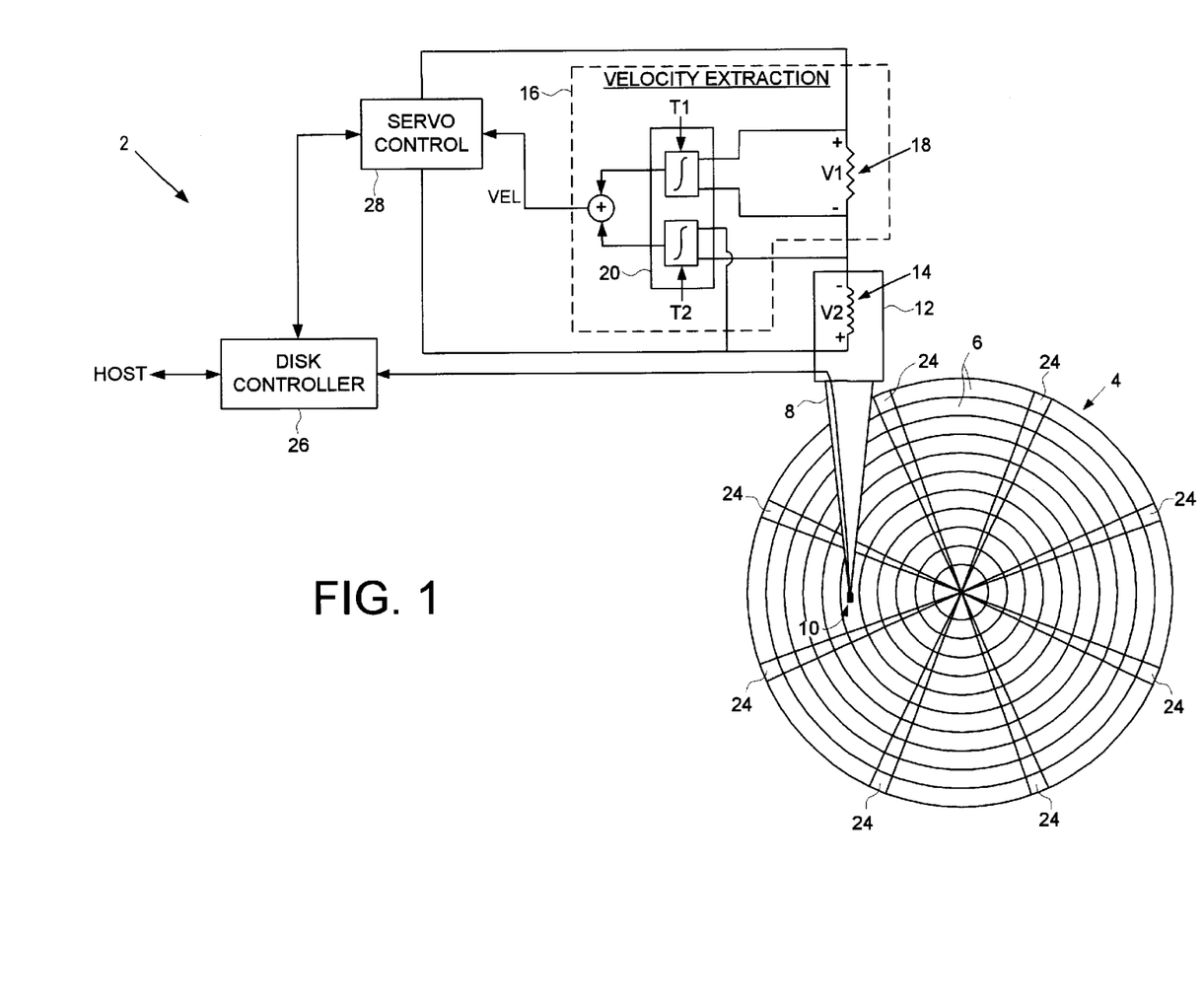
FIG. 1 shows a disk drive according to an embodiment of the present invention comprising a velocity extraction circuit with an integrator for integrating a voltage representing the current flowing through the voice coil of a voice coil motor during a first time interval and the voltage across the voice coil during a second time interval, the sum of which cancels the resistance of the voice coil from the back EMF measurement to extract the velocity of the actuator arm.

FIG. 1 shows a disk drive 2 according to an embodiment of the present invention comprising a disk 4 having a plurality of tracks 6, an actuator arm 8, a head 10 connected to a distal end of the actuator arm 8, a voice coil motor 12 comprising a voice coil 14, the voice coil motor 12 for rotating the actuator arm 8 about a pivot to actuate the head 10 radially over the disk 4, and a velocity extraction circuit 16 for extracting a velocity of the actuator arm 8 from a back EMF voltage across the voice coil 14. The velocity extraction circuit 16 comprises an integrator 20. During a first time interval T1 the integrator 20 integrates a first voltage V1 representing a current flowing through the voice coil 14 to generate a first integration, and during a second time interval T2 integrates a second voltage V2 across the voice coil 14 to generate a second integration. A polarity of the first voltage V1 is opposite a polarity of the second voltage V2, and the velocity of the actuator arm 8 is computed by summing the first and second integrations.

In the embodiment of FIG. 1, the velocity extraction circuit 16 comprises a sense resistor connected in series with the voice coil 14 for detecting the current flowing through the voice coil 14, wherein the first voltage V1 is measured across the sense resistor 18.

Also in the embodiment of FIG. 1, the disk 4 comprises a plurality of embedded servo sectors 24 recorded at a predetermined interval around the circumference of each track 6. Each embedded servo sector 24 comprises coarse head positioning information (e.g., a track number) and fine head position information (e.g., servo bursts). A disk controller 26 processes a read signal emanating from the head 10 to detect and process the head positioning information in the embedded servo sectors 24 to derive a radial location of the head 10 with respect to the tracks 6. A head position error is generated as the difference between the actual position of the head 10 and the desired position of the head 10. The head position error is processed by servo control circuitry 28 which generates the driving voltage applied to the voice coil 14 of the voice coil motor 12, thereby controlling the velocity of the actuator arm 8 to control the radial position of the head 10.

At times when the embedded servo information is unavailable (e.g., during ramp loading/unloading) the velocity extraction circuit 16 extracts the velocity of the actuator arm 8 from the back EMF voltage across the voice coil 14. The resistance of the voice coil 14 is canceled from the back EMF measurement by performing a calibration procedure which adjusts at least one of the integration time intervals (T1 and/or T2) until the measured back EMF voltage is substantially zero when the velocity of the actuator arm 8 is zero. In other words, at least one of the integration time intervals (T1 and/or T2) is adjusted until the resulting integrations are substantially equal so that the sum of the integrations is substantially zero.

The calibration procedure may be performed while pressing the actuator arm 8 against a fixed object so that the velocity of the actuator arm is zero, or during a normal tracking operation when the average velocity of the actuator arm is zero. Calibrating the back EMF measurement during a normal tracking operation avoids the performance degradation of moving the actuator arm 8 to a fixed object at the periphery of the disk 4. When the servo control circuitry 28 is moving the actuator arm 8 in a velocity controlled mode (e.g., during ramp loading/unloading), the sum of the integrated voltages V1 and V2 over the time intervals T1 and T2 represents the measured back EMF voltage with the resistance of the voice coil 14 canceled. However, the embodiment of FIG. 1 does not cancel the transient response of the inductor (L·di/dt) of the voice coil 14 from the back EMF measurement which can distort the detected velocity of the actuator arm 8 because after each sampled servo sample an unknown current change is possible which results in a voltage transient due to the inductor (L·di/dt).

Figure 2A:
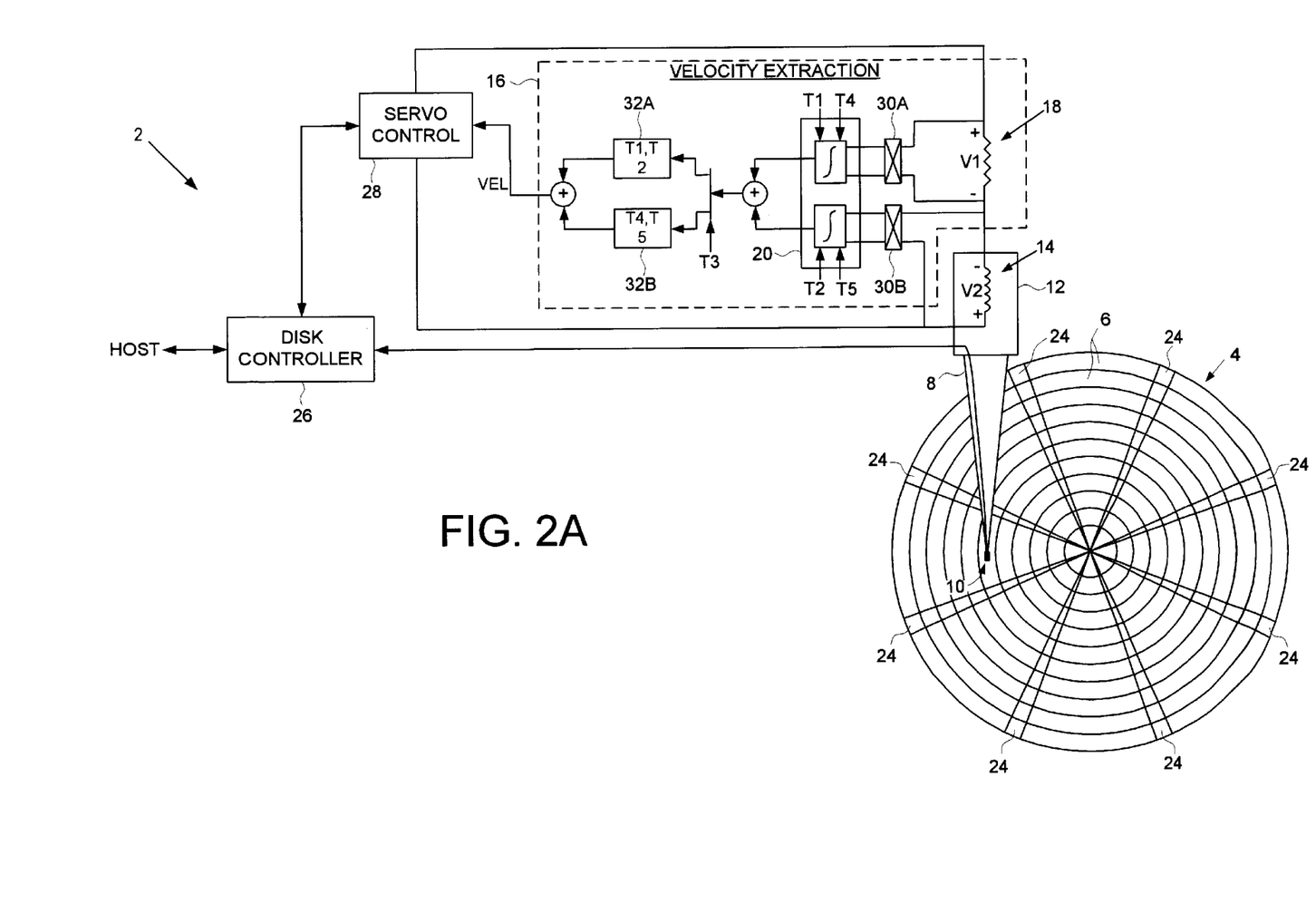
FIG. 2A shows a disk drive according to an embodiment of the present invention wherein after a third time interval the velocity extraction circuit integrates the reverse polarity of the voltage representing the current flowing through the voice coil during a fourth time interval and the reverse polarity of the voltage across the voice coil during a fifth time interval, the sum of which is used to cancel the resistance and inductance (L·di/dt) of the voice coil from the back EMF measurement to extract the velocity of the actuator arm.
Figure 2B:
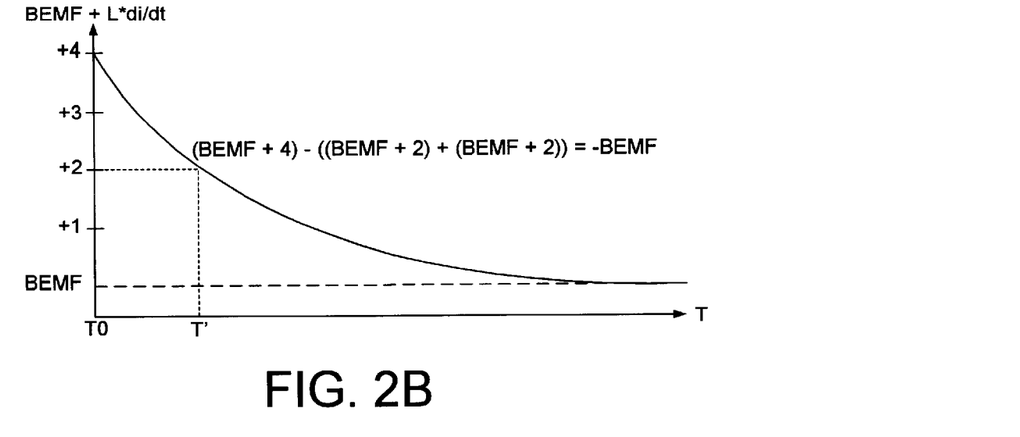
FIGS. 2B–2D illustrate how the integrations generated in the embodiment of FIG. 2A cancel both the resistance and inductance (L·di/dt) of the voice coil.

FIG. 2A shows an embodiment of the present invention which cancels the resistance of the voice coil 14 as well as the inductance (L·di/dt) of the voice coil 14 from the back EMF measurement. FIG. 2B illustrates the exponential decaying transient response of the voice coil 14 in response to a step command. The transient response of the inductor (L·di/dt) is canceled by taking a first measurement of the back EMF voltage and subtracting one or more measurements after an appropriate interval such that the result is substantially zero. Referring again to FIG. 2B and neglecting the effect of the voice coil resistance, at time T0 the back EMF voltage is BEMF+4 volts consisting of a back EMF DC component and the transient component due to L·di/dt.

Figure 2C:
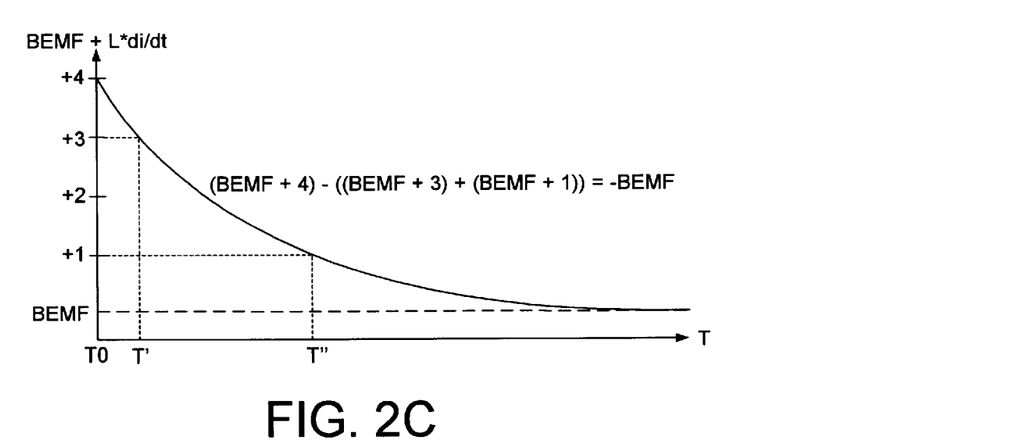

At time T' the back EMF voltage is BEMF+2V consisting of the back EMF DC component and the transient component due to L·di/dt. The transient component can be canceled from the back EMF measurement (leaving only the back EMF DC component) by subtracting twice the voltage measured at time T' from the voltage measured at time T0. Similarly, the transient component can be canceled from the back EMF measurement by subtracting from the voltage measured at time T0 the voltage measured at time T' plus the voltage measured at time T" as illustrated in FIG. 2C. Thus, any suitable number of measurements may be taken to cancel the transient component due to L·di/dt.

Figure 2D:
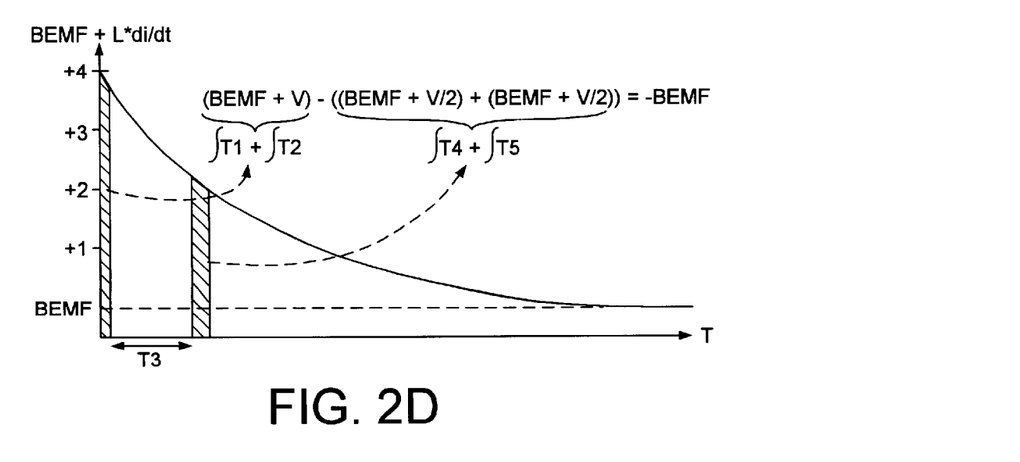

FIG. 2D illustrates how the velocity extraction circuit in the embodiment of FIG. 2A cancels the transient component due to L·di/dt similar to FIG. 2B. The circuit is first configured to integrate the voltage across the sense resistor 18 during interval T1 and then the voltage across the voice coil 14 during interval T2. The integrations are summed to generate a measurement of BEMF+V. After time interval T3, the circuit is configured to integrate the reverse polarity voltage across the sense resistor 18 during time interval T4 (twice T1) and to integrate the reverse polarity voltage across the voice coil 14 during time interval T5 (twice T2). The integrations are summed to generate a measurement of (BEMF+V/2)+(BEMF+V/2) and subtracted from the original measurement BEMF+V to generate a final measurement of −BEMF which represents the velocity of the actuator arm 8.

The velocity extraction circuit 16 in the embodiment of FIG. 2A comprises timers and switching circuitry to implement the velocity extraction function. A switch 30A is configured to apply the voltage across the sense resistor 18 to the integrator 20 in a forward and reverse polarity, and a switch 30B is configured to apply the voltage across the voice coil 14 in a forward and reverse polarity. The disk drive performs the following operations during the calibration mode 1. press the actuator arm 8 against a fixed object so that its velocity is zero,
2. configure switch 30A to apply voltage V1 to the integrator 20;
3. integrate voltage V1 for a time interval T1;
4. configure switch 30B to apply voltage V2 to the integrator 20;
5. integrate voltage V2 for a time interval T2;
6. sum the integrations to generate a back EMF measurement and store the result in storage element 32A;
7. process the back EMF measurement to adjust at least one of the integration time intervals T1 and/or T2;
8. repeat steps 2–7 until the resulting back EMF measurement is substantially zero;
9. apply a step control voltage to the voice coil 14 to generate a transient response similar to FIG. 2D;
10. repeat steps 2–6;
11. wait for a delay interval T3;
12. configure switch 30A to apply the reverse polarity of voltage V1 to the integrator 20;
13. integrate the reverse polarity of voltage V1 for a time interval T4;
14. configure switch 30B to apply the reverse polarity of voltage V2 to the integrator 20;
15. integrate the reverse polarity of voltage V2 for a time interval T5;
16. sum the integrations and store the result in storage element 32B;
17. subtract the contents of storage element 32B from storage element 32A to generate a back EMF measurement;
18. process the back EMF measurement to adjust the delay interval T3;
19. repeat steps 9–18 until the resulting back EMF measurement is substantially zero; and
20. store the integration times T1–T5 for use during velocity control mode.

Steps 2–8 in the above process adjust at least one of the integration time intervals T1 and/or T2 until the resistance of the voice coil 14 is canceled from the back EMF measurement. The time intervals T4 and T5 are twice the time intervals of T1 and T2 so that the back EMF measurement is doubled at time T3 as shown in FIG. 2D. The delay interval T3 is adjusted at step 18 until the resulting integrations cancel the transient response of the inductor (L·di/dt). Once the time intervals have been calibrated, they are stored for use during the velocity control mode (e.g., during ramp loading/unloading).

When the servo control circuitry 28 is moving the actuator arm 8 in the velocity controlled mode, the velocity control circuit 16 performs steps 2–6 and steps 11–17 to cancel the resistance component and transient component (L·di/dt) to thereby extract the velocity of the actuator arm 8 from the back EMF measurement. The entire calibration procedure is executed periodically to compensate for changes in the resistance and transient response (L·di/dt) of the voice coil 14. Since the transient response (L·di/dt) is relatively static, the disk drive performs the entire calibration procedure infrequently (e.g., each time the disk drive is powered on) to avoid the latency in moving the actuator arm 8 to the fixed object at the periphery of the disk. However, since the resistance of the voice coil 14 may fluctuate more readily (e.g., with temperature fluctuations), the disk drive performs steps 2–8 of the calibration procedure over a shorter interval, such as during normal tracking operations when the average velocity of the actuator arm is zero. Calibrating the resistance of the voice coil 14 during tracking operations does not impact performance since the actuator arm 8 is not moved to the periphery of the disk and pressed against the fixed object.

The velocity extraction circuit 16 is shown in FIG. 1 and FIG. 2A as comprising two integrators for integrating the velocity across the sense resistor 18 and the velocity across the voice coil 14, respectively. However, the velocity extraction circuit 16 may be implemented using a single integrator with appropriate switching circuitry for selecting the desired voltage during each time interval. In addition, the integrator may be implemented using any suitable circuitry, including analog, digital, or both.

Figure 3:
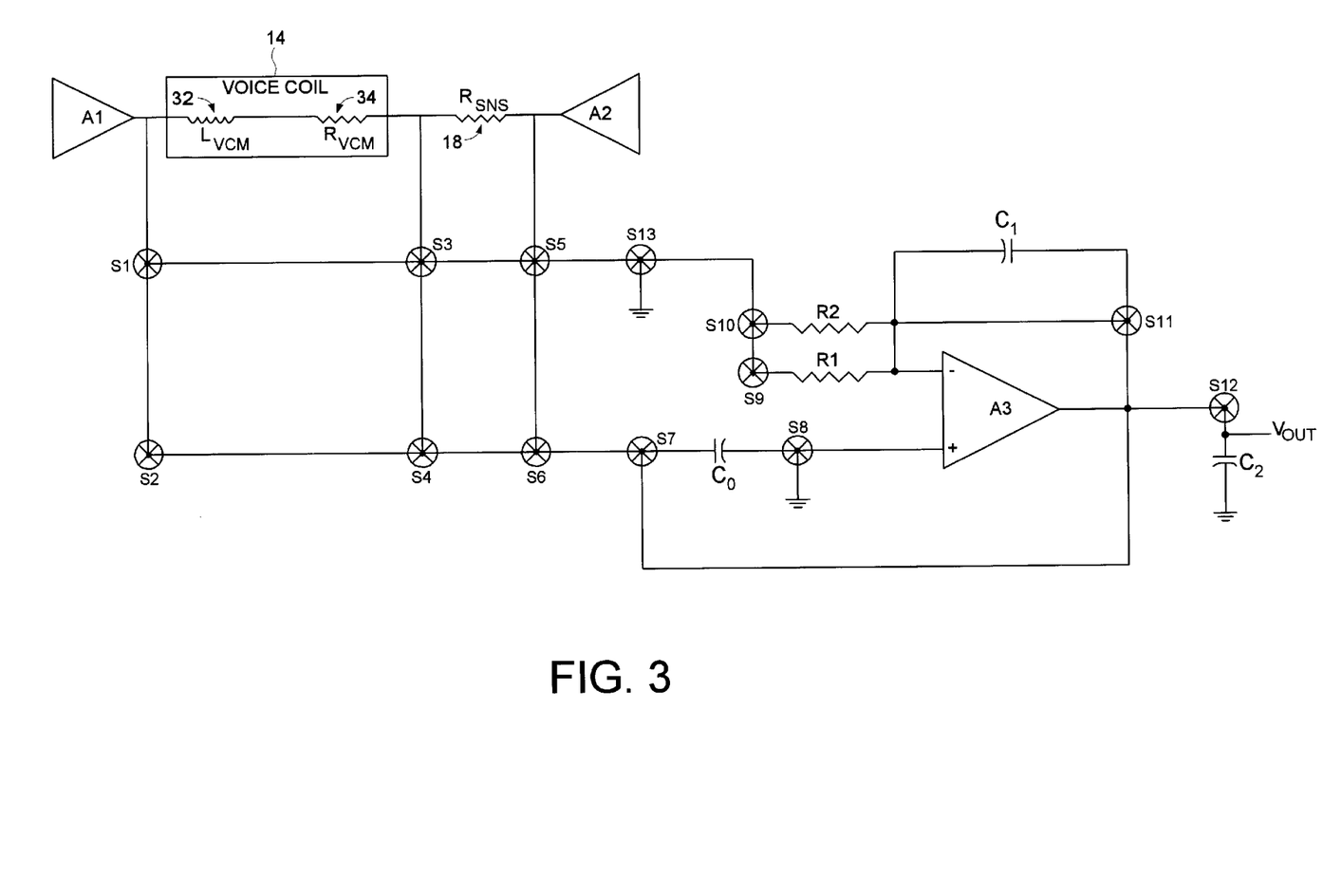
FIG. 3 shows circuitry of an integrator according to an embodiment of the present invention comprising a capacitor, an amplifier, resistors for setting the gain of the amplifier, and a plurality of switches for configuring the circuitry.

FIG. 3 shows suitable circuitry for implementing the integrator of the velocity extraction circuit 16 in the analog domain. An equivalent circuit is shown for the voice coil 14 as comprising an inductor 32 and a resistor 34. Amplifiers A1 and A2 apply a control voltage across the voice coil 14 and sense resistor 18. In this embodiment, the integrator comprises an amplifier A3, a capacitor $C_1$, and resistors R1 and R2 for setting the gain of amplifier A3. Cross-point switches S1–S13 configure the integrator to integrate the appropriate voltage during each integration time interval.

Figure 4A:
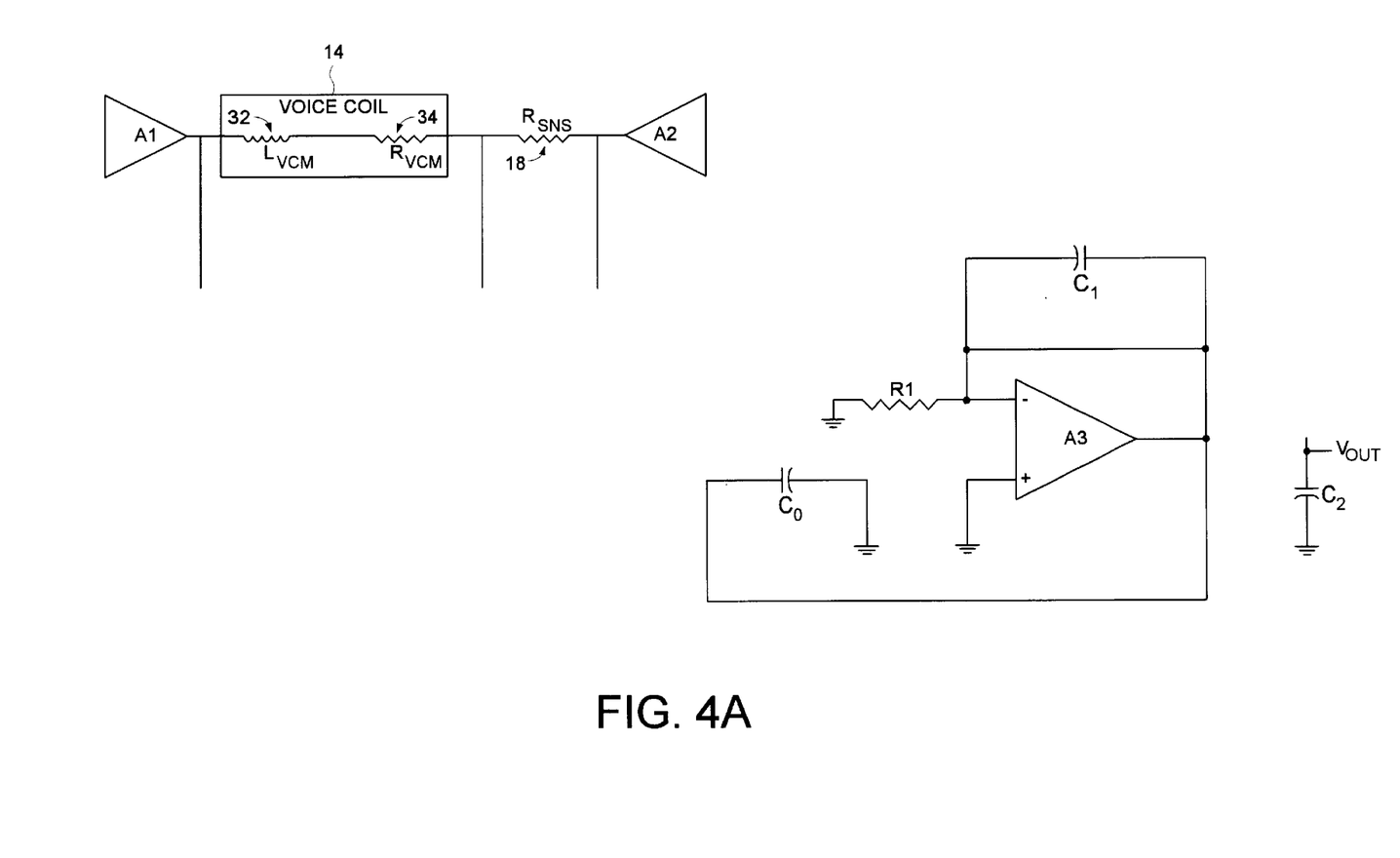
FIG. 4A shows the circuitry of FIG. 3 configured to initialize the integrator by storing the offset of the amplifier on a capacitor and zeroing the integrating capacitor.

At the beginning of the calibration procedure, the actuator arm 8 is pressed against a fixed object so that its velocity is substantially zero and cross-point switches S1–S13 are set to configure the circuit of FIG. 3 into the circuit shown in FIG. 4A. This configuration zeros the capacitor $C_1$ and stores the offset of the amplifier A3 on capacitor $C_0$.

Figure 4B:
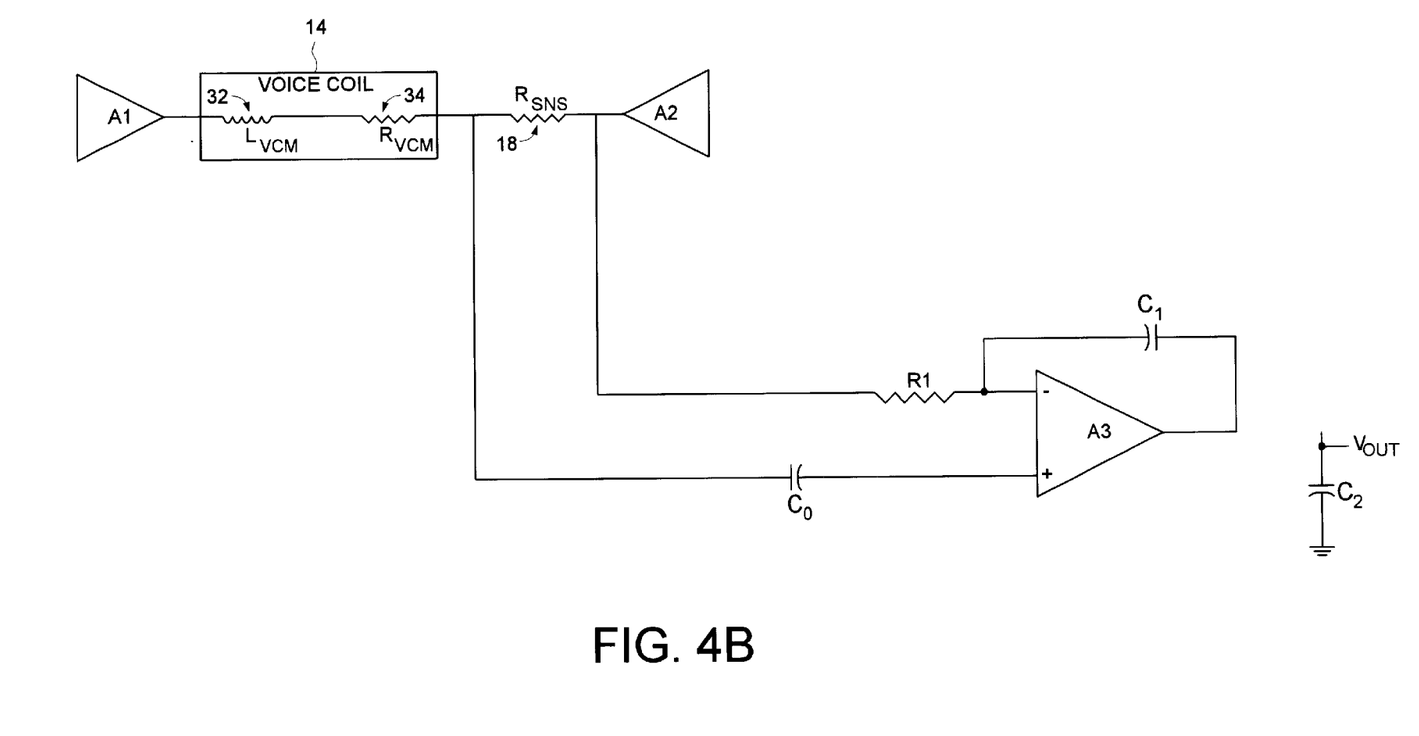
FIG. 4B shows the circuitry of FIG. 3 configured to integrate the voltage across the sense resistor during a first time interval.
Figure 4C:
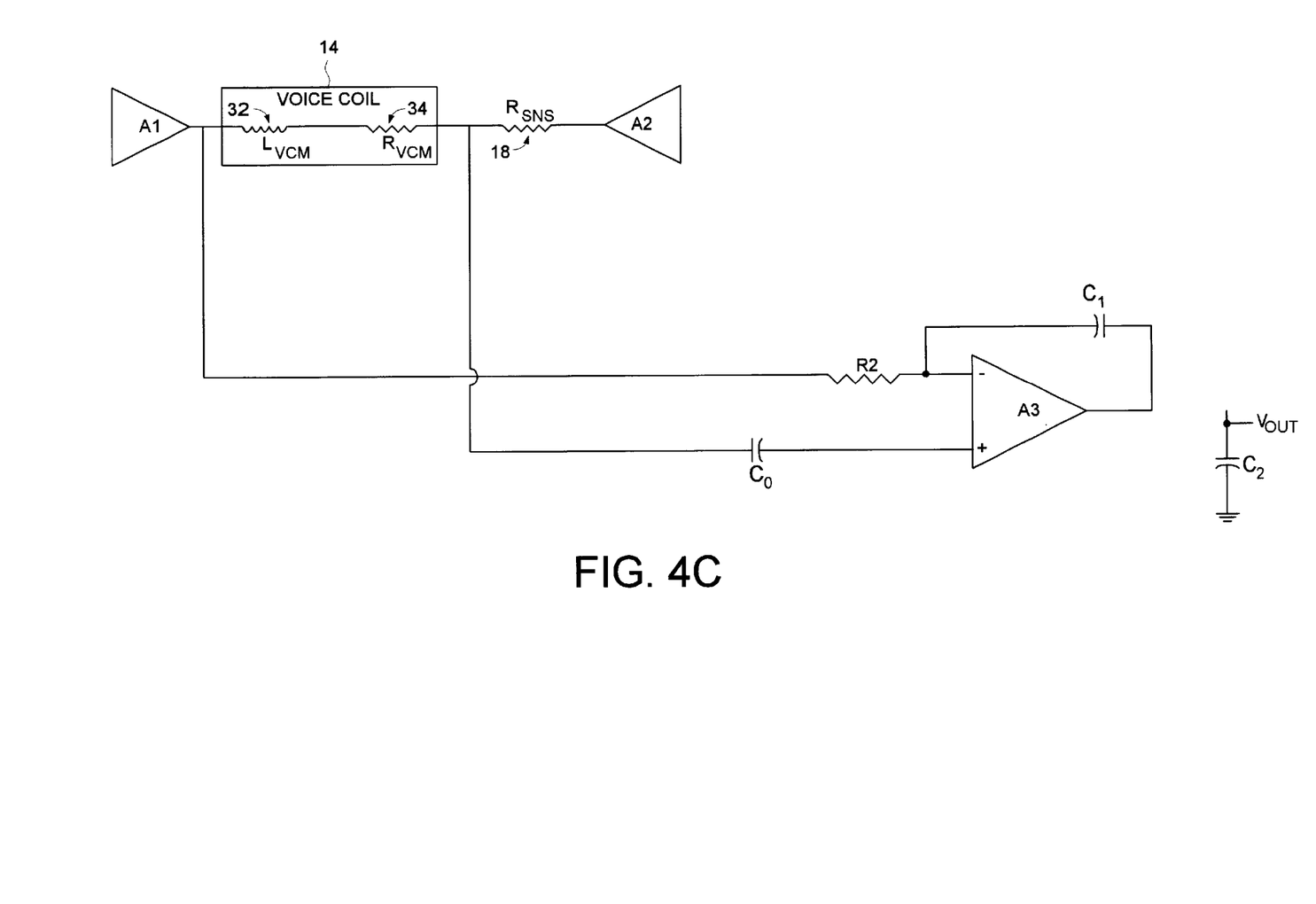
FIG. 4C shows the circuitry of FIG. 3 configured to integrate the voltage across the voice coil during a second time interval.

The cross-point switches S1–S13 are then set to configure the circuit of FIG. 3 into the circuit shown in FIG. 4B. This configuration integrates the voltage across the sense resistor 18 during the integration time interval T1, wherein the gain of amplifier A3 is determined by resistor R1. The cross-point switches S1–S13 are then set to configure the circuit of FIG. 3 into the circuit shown in FIG. 4C. This configuration integrates the voltage across the voice coil 14 during the integration time interval T2, wherein the gain of amplifier A3 is determined by resistor R2. In one embodiment, the sense resistor 18 is significantly smaller than the resistance 34 of the voice coil 14 (e.g., 10:1), and the resistors R1 and R2 are selected so that the integrations intervals T1 and T2 are approximately the same so that the noise is averaged in essentially the same manner for both measurements.

Figure 4D:
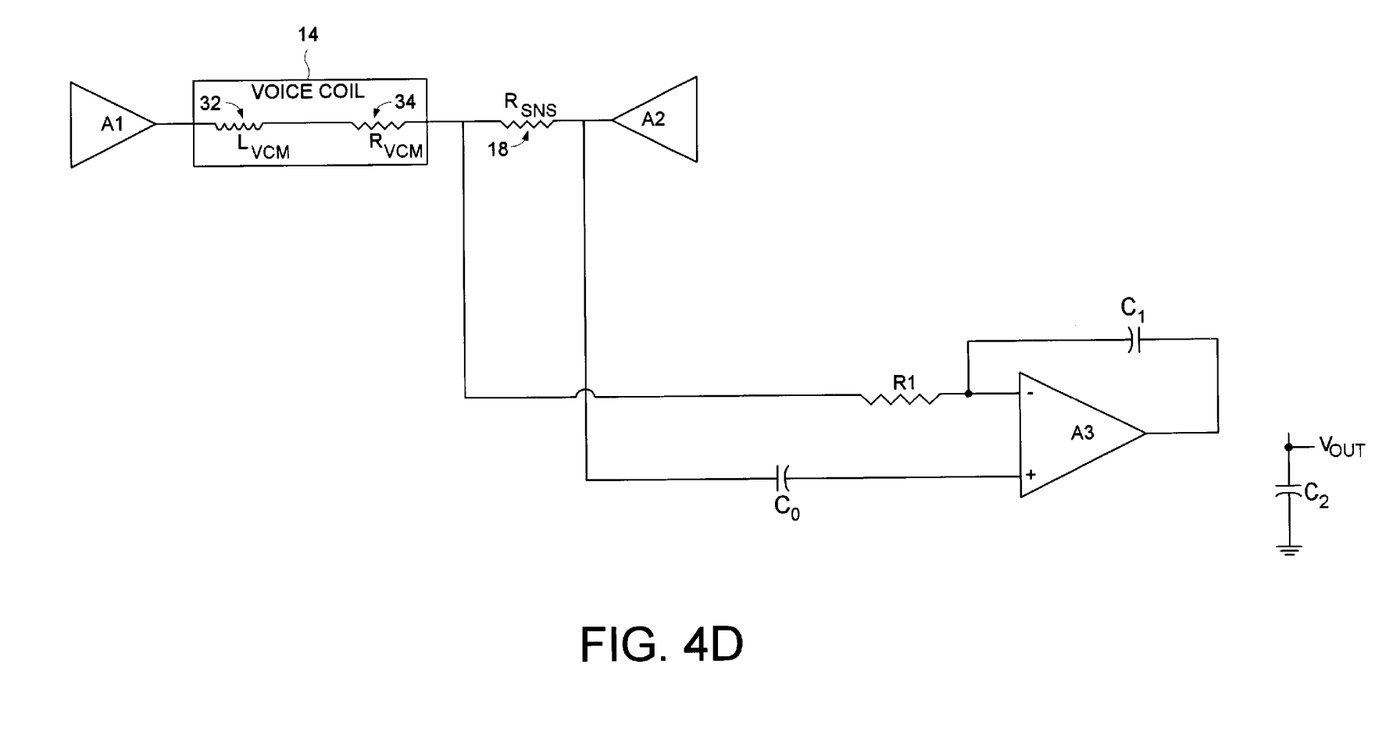
FIG. 4D shows the circuitry of FIG. 3 configured after a third time interval to integrate the reverse polarity of the voltage across the sense resistor during a fourth time interval.
Figure 4E:
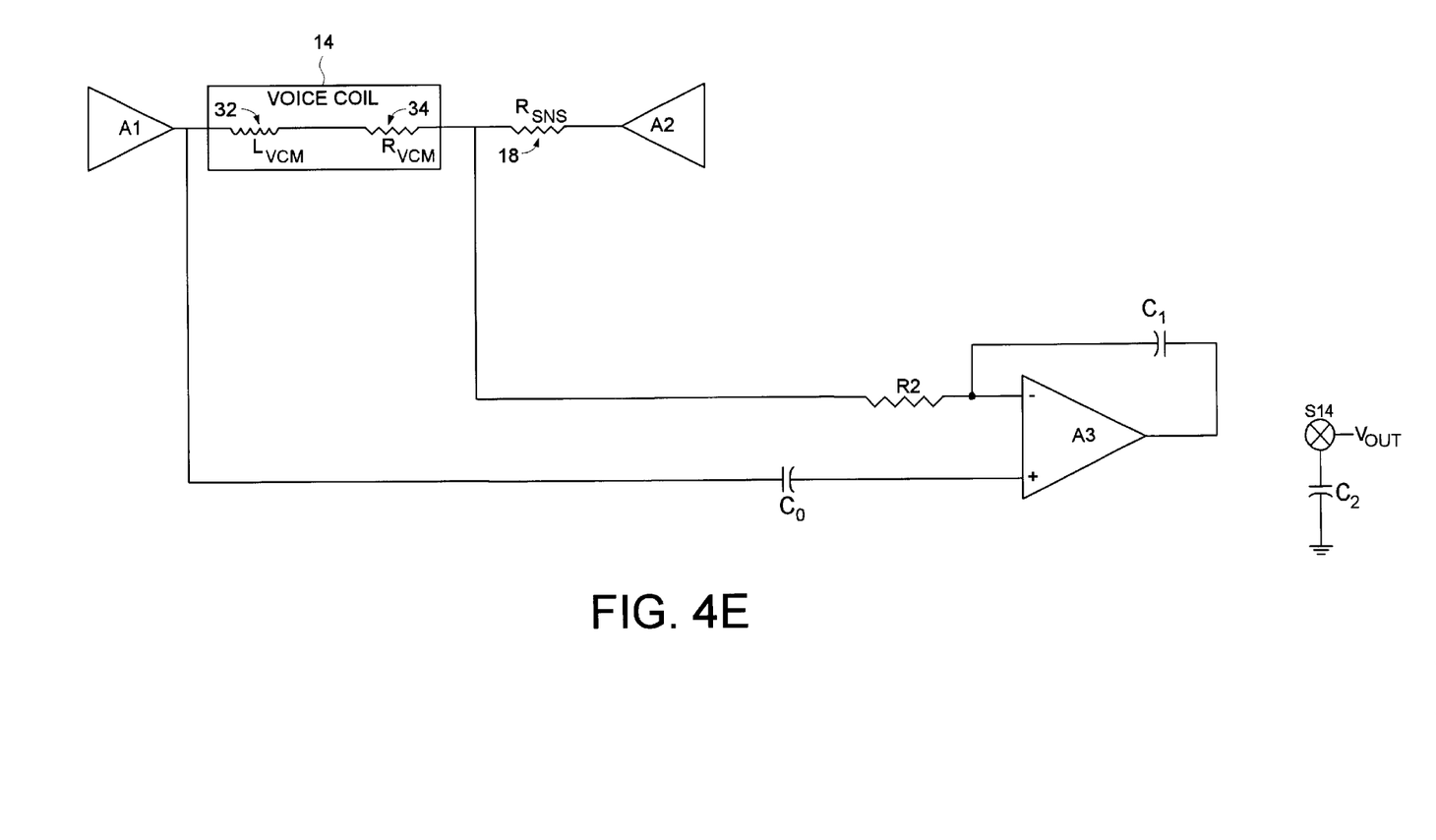
FIG. 4E shows the circuitry of FIG. 3 configured to integrate the reverse polarity of the voltage across the voice coil during a fifth time interval.
Figure 4F:
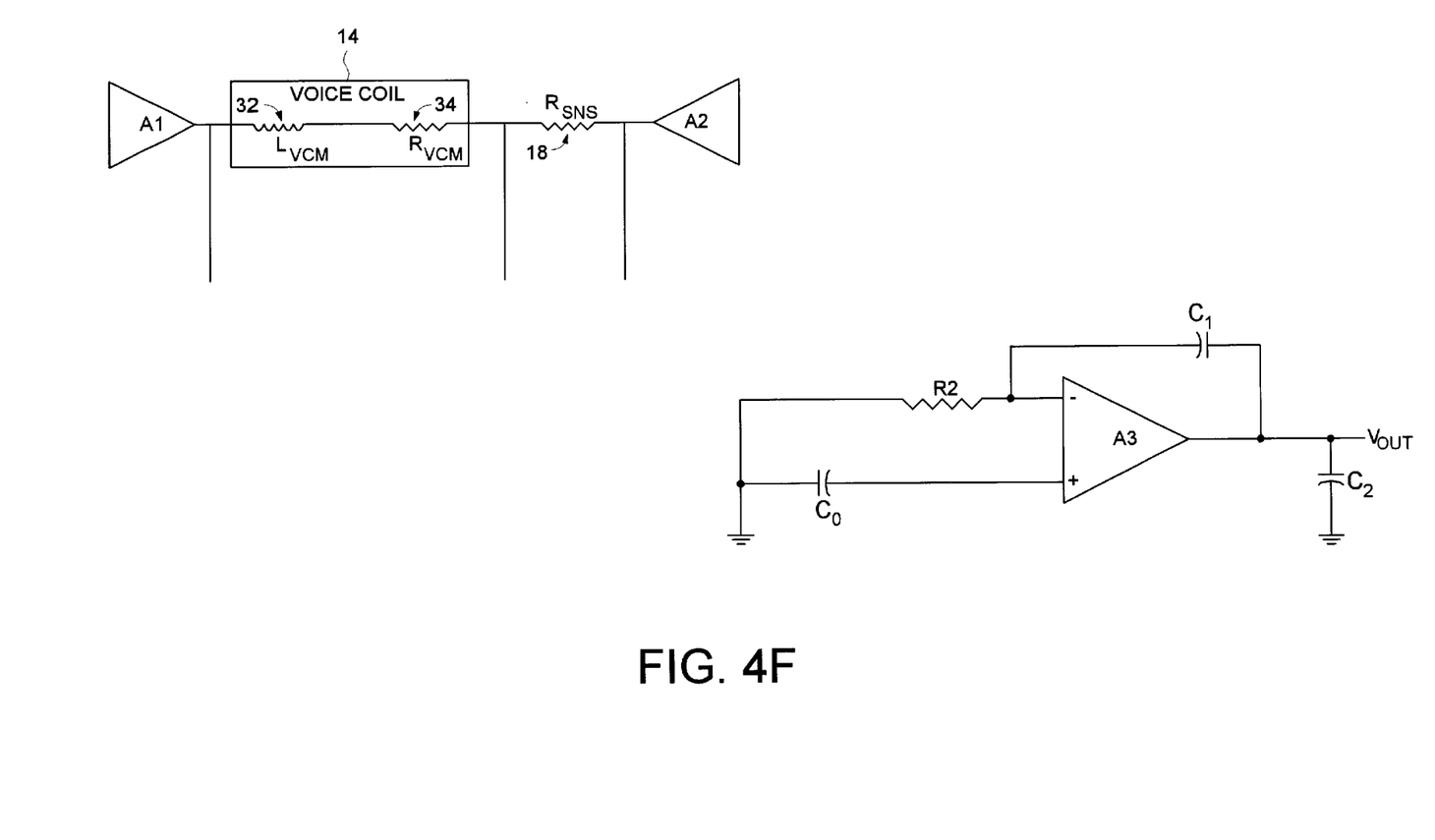
FIG. 4F shows the circuitry of FIG. 3 configured to store the resulting integrations onto an output capacitor for use in calibrating the time intervals.

The capacitor $C_1$ stores the sum of the integrated voltages over the integration time intervals T1 and T2 (the sum of the integrated sense resistor voltage plus the integrated voice coil voltage). Since the polarity of the integrated voltages are opposite, the sum of the integrations will be substantially zero when the integration time intervals are properly calibrated. Thus the cross-point switches S1–S13 are set to configure the circuit of FIG. 3 into the circuit shown in FIG. 4F in order to transfer the voltage stored across the capacitor $C_1$ to the capacitor $C_2$. The voltage stored across capacitor $C_2$ is then evaluated and at least one of the integration time intervals T1 and/or T2 is adjusted. The procedure is then re-iterated starting with FIG. 4B until the voltage stored across $C_2$ is substantially zero. The calibrated integration time intervals T1 and T2 are saved and used while calibrating for the transient response (L·di/dt) of the voice coil 14.

When calibrating for the transient response (L·di/dt), the voice coil 14 is driven by amplifiers A1 and A2 by a step response to generate a transient response similar to FIG. 2D. Again the cross-point switches S1–S13 are set to configure the circuit of FIG. 3 into the circuit shown in FIG. 4A to zero the capacitor $C_1$ and store the offset of the amplifier A3 on capacitor $C_0$. The cross-point switches S1–S13 are then set to configure the circuit of FIG. 3 into the circuit shown in FIG. 4B for the calibrated integration time interval T1, and set to configure the circuit of FIG. 3 into the circuit shown in FIG. 4C for the calibrated integration time interval T2. At this point, the capacitor $C_1$ stores the sum of the integrated voltages over the calibrated integration time intervals T1 and T2. After delay interval T3, cross-point switches S1–S13 are set to configure the circuit of FIG. 3 into the circuit shown in FIG. 4D in order to integrate the reverse polarity voltage across the sense resistor 18 for integration time interval T4 (twice T1). The cross-point switches S1–S13 are then set to configure the circuit of FIG. 3 into the circuit shown in FIG. 4E in order to integrate the reverse polarity voltage across the voice coil 14 for integration time interval T5 (twice T2). At this point, the capacitor $C_1$ stores the sum of the integrated voltages during integration time intervals T1 and T2 minus the sum of the integrated voltages during integration time intervals T4 and T5. If the delay interval T3 is properly calibrated, the transient response (L·di/dt) will cancel and the voltage stored by the capacitor $C_1$ will be substantially zero. Thus the cross-point switches S1–S13 are set to configure the circuit of FIG. 3 into the circuit shown in FIG. 4F in order to transfer the voltage stored across the capacitor $C_1$ to the capacitor $C_2$. The voltage stored across capacitor $C_2$ is then evaluated and the delay interval T3 is adjusted. The procedure is then re-iterated starting with FIG. 4B until the voltage stored across capacitor $C_2$ is substantially zero. The calibrated integration time intervals T1, T2, T4 and T5 and the delay interval T3 are saved and used during the velocity control mode (e.g., during ramp loading/unloading).

During the velocity control mode, the cross-point switches S1–S13 are set to configure the circuit of FIG. 3 into the circuits shown in FIGS. 4A–4F over calibrated integration time intervals T1 and T2, over the calibrated delay interval T3, and over the calibrated integration time intervals T4 and T5. The resulting voltage stored across capacitor $C_2$ represents the voltage of the actuator arm 8 extracted from the back EMF voltage with the resistance and transient response (L·di/dt) substantially canceled. As described above, the integration time intervals T1 and T2 may be recalibrated periodically during a normal tracking operation using the circuit configurations shown in 4A–4C and 4F to compensate for fluctuations in the resistance of the voice coil 14 without moving the actuator arm 8 to a fixed object at the periphery of the disk.

In the above embodiments, the integration time intervals T1 and T2 may be reversed in time. In other words, the velocity extraction circuit 16 may first integrate the voltage over the voice coil 14 during integration time interval T2, and then integrate the voltage over the sense resistor 18 during integration time interval T1.

Figure 5:
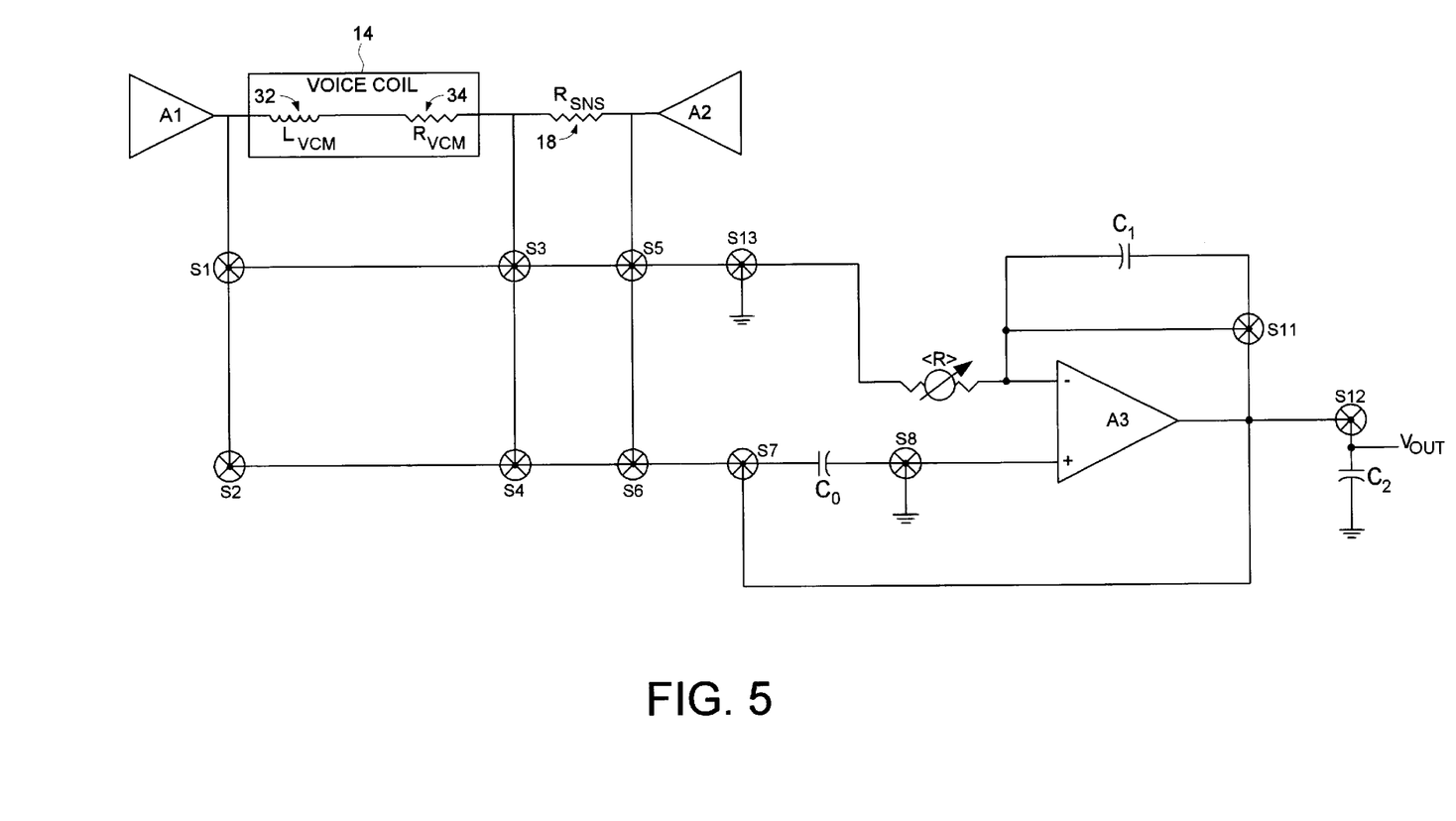
FIG. 5 shows an equivalent circuit of FIG. 3 wherein a variable resistor for setting the gain of the amplifier is adjustable to facilitate alternative embodiments of the present invention.

Also in the embodiments described above, the integration time intervals T1 and T2 are calibrated to effectively cancel entirely the resistance of the voice coil 14 in the back EMF measurement. In an alternative embodiment, the integration time intervals T1 and T2 are calibrated so that the resistance of the voice coil 14 is not entirely canceled to ensure the closed loop system remains stable. Any suitable technique can be employed to achieve this objective, such as using different values for resistors R1 and R2 in FIG. 3 during the velocity control mode so that the resistance of the voice coil 14 does not entirely cancel from the back EMF measurement. FIG. 5 shows the equivalent circuit of FIG. 3 wherein resistors R1 and R2 are replaced with a variable resistor <R> which can take on multiple values. Any suitable technique may be employed for implementing the variable resistor <R>, including a switched bank of resistors.

In yet another embodiment, the variable resistor <R> in FIG. 5 is adjusted when calibrating the resistance of the voice coil 14 rather than adjusting the integration time intervals T1 and/or T2. That is, the calibrated value(s) for the variable resistor <R> is adjusted at step 7 of the above calibration procedure until the resulting back EMF measurement is substantially zero at step 8. The calibrated value(s) for the variable resistor <R> is stored and used to calibrate the transient response (L·di/dt) as well as during the velocity control mode.

I claim:

1. A disk drive comprising:
    (a) a disk comprising a plurality of tracks;
    (b) an actuator arm;
    (c) a head connected to a distal end of the actuator arm;
    (d) a voice coil motor comprising a voice coil, the voice coil motor for rotating the actuator arm about a pivot to actuate the head radially over the disk; and
    (e) a velocity extraction circuit for extracting a velocity of the actuator arm from a back EMF voltage across the voice coil, the velocity extraction circuit comprising an integrator for integrating a first voltage representing a current flowing through the voice coil during a first time interval to generate a first integration and for integrating a second voltage across the voice coil during a second time interval to generate a second integration, wherein:
        a polarity of the first voltage is opposite a polarity of the second voltage; and the velocity of the actuator arm is computed by summing the first and second integrations.

2. The disk drive as recited in claim 1, wherein:

(a) the voltage extraction circuit comprises a sense resistor connected in series with the voice coil for detecting the current flowing through the voice coil; and (b) the first voltage is measured across the sense resistor.

3. The disk drive as recited in claim 1, wherein during a calibration mode when the velocity of the actuator arm is substantially zero at least one of the first and second time intervals is adjusted until the sum of the first and second integrations substantially equals a predetermined value.

4. The disk drive as recited in claim 1, wherein:

(a) the integrator comprises an amplifier and at least one variable resistor for setting the gain of the amplifier; and (b) during a calibration mode when the velocity of the actuator arm is substantially zero the variable resistor is adjusted until the sum of the first and second integrations substantially equals a predetermined value.

5. The disk drive as recited in claim 1, wherein during a calibration mode the actuator arm is pressed against a fixed object.

6. The disk drive as recited in claim 1, wherein during a calibration mode the head is maintained over a centerline of a target track during a tracking operation so that the velocity of the actuator arm is substantially zero on average.

7. The disk drive as recited in claim 1, wherein the integrator comprises an amplifier and a capacitor.

8. The disk drive as recited in claim 1, wherein:

(a) after a third time interval following the first and second time intervals the integrator integrates a third voltage across the sense resistor during a fourth time interval to generate a third integration and integrates a fourth voltage across the voice coil during a fifth time interval to generate a fourth integration;

(b) a polarity of the third voltage is opposite a polarity of the first voltage;

(c) a polarity of the fourth voltage is opposite a polarity of the second voltage; and (d) the velocity of the actuator arm is derived relative to the sum of the first, second, third and fourth integrations.

9. The disk drive as recited in claim 8, wherein the fourth time interval is greater than the first time interval and the fifth time interval is greater than the second time interval.

10. The disk drive as recited in claim 8, wherein during a calibration mode when the velocity of the actuator arm is substantially zero the third time interval is adjusted until the sum of the first, second, third and fourth integrations substantially equals a predetermined value.

11. A method of extracting a velocity of an actuator arm in a disk drive from a back EMF voltage across a voice coil of a voice coil motor, the method comprising the steps of (a) integrating a first voltage representing a current flowing through the voice coil during a first time interval to generate a first integration; and (b) integrating a second voltage across the voice coil during a second time interval to generate a second integration, wherein a polarity of the first voltage is opposite a polarity of the second voltage; and;

(c) computing the velocity of the actuator arm by summing the first and second integrations.

12. The method as recited in claim 11, wherein:

(a) a sense resistor is connected in series with the voice coil for detecting the current flowing through the voice coil; and (b) the first voltage is measured across the sense resistor.

13. The method as recited in claim 11, wherein during a calibration mode when the velocity of the actuator arm is substantially zero further comprising the step of adjusting at least one of the first and second time intervals until the sum of the first and second integrations substantially equals a predetermined value.

14. The method as recited in claim 11, wherein during a calibration mode when the velocity of the actuator arm is substantially zero further comprising the step of adjusting a gain of an amplifier until the sum of the first and second integrations substantially equals a predetermined value.

15. The method as recited in claim 11, further comprising the step of pressing the actuator arm against a fixed object during a calibration mode.

16. The method as recited in claim 11, further comprising the step of maintaining the head over a centerline of a target track during a tracking operation so that the velocity of the actuator arm is substantially zero on average during a calibration mode.

17. The method as recited in claim 11, further comprising the steps of (a) waiting for a third time interval after the first and second time intervals;

(b) integrating a third voltage across the sense resistor during a fourth time interval to generate a third integration;

(c) integrating a fourth voltage across the voice coil during a fifth time interval to generate a fourth integration, wherein:
a polarity of the third voltage is opposite a polarity of the first voltage;
a polarity of the fourth voltage is opposite a polarity of the second voltage; and
the velocity of the actuator arm is derived relative to the sum of the first, second, third and fourth integrations.

18. The method as recited in claim 17, wherein the fourth time interval is greater than the first time interval and the fifth time interval is greater than the second time interval.

19. The method as recited in claim 17, wherein during a calibration mode when the velocity of the actuator arm is substantially zero further comprising the step of adjusting the third time interval until the sum of the first, second, third and fourth integrations substantially equals a predetermined value.

* * * * *